S. S. DAVIS.
Farm-Gate.

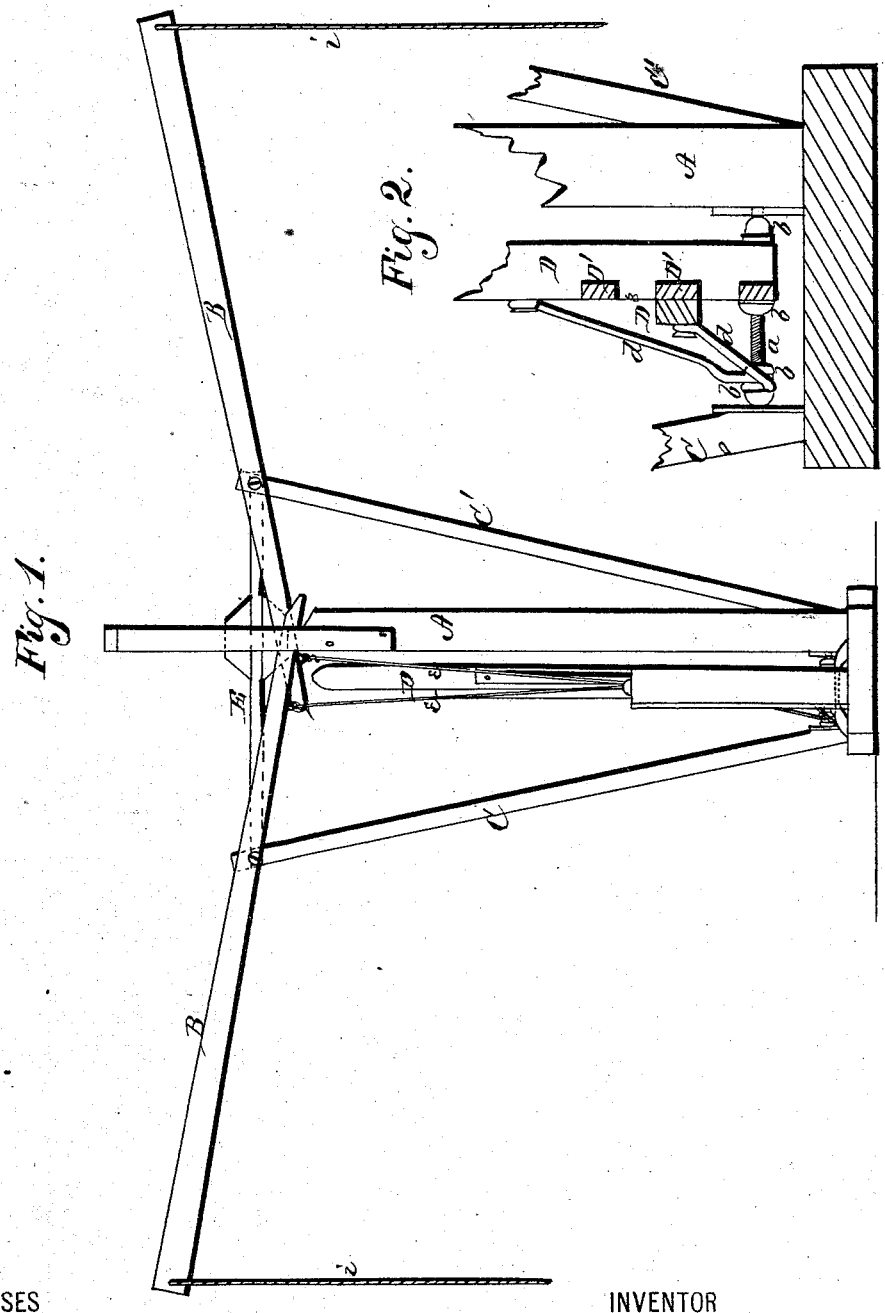

No. 159,648.

2 Sheets--Sheet 2

Patented Feb. 9, 1875.

WITNESSES
F. H. Schott
C. L. Evert.

INVENTOR
Stephen S. Davis
per
Alexander Mason
Attorneys

UNITED STATES PATENT OFFICE.

STEPHEN S. DAVIS, OF CHICAGO, ILLINOIS, ASSIGNOR TO POLLOCK BARBOUR, OF LOUISVILLE, KENTUCKY.

IMPROVEMENT IN FARM-GATES.

Specification forming part of Letters Patent No. 159,648, dated February 9, 1875; application filed July 23, 1874.

*To all whom it may concern:*

Be it known that I, STEPHEN S. DAVIS, of the city of Chicago, in the county of Cook, and in the State of Illinois, have invented certain new and useful Improvements in Gates; and do hereby declare that the following is a full, clear, and exact description thereof, reference being had to the accompanying drawings, and to the letters of reference marked thereon, making a part of this specification.

The nature of my invention consists in the construction and arrangement of a tilting gate, being an improvement on the gate for which Letters Patent No. 83,046 were granted to me October 13, 1868, as will be hereinafter more fully set forth.

In order to enable others skilled in the art to which my invention appertains to make and use the same, I will now proceed to describe its construction and operation, referring to the annexed drawings, in which—

Figure 3:
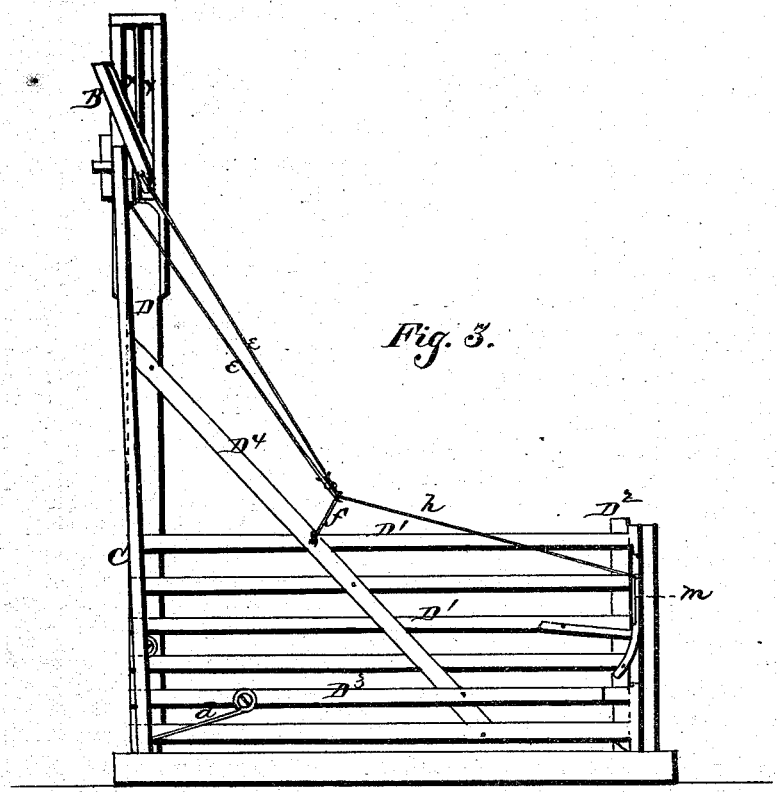
Figure 4:

Figure 1 is an end elevation of my improved gate. Fig. 2 is an enlarged cross-section through the lower inner end of the same. Fig. 3 is a side view of the gate, and Fig. 4 is a horizontal section of the gate proper.

A represents an upright post of any suitable dimensions, planted firmly in the ground. The upper end of the post A is formed with two vertical slots, $x$ $x$, for the passage of the operating-levers B B, said levers being pivoted to the upper ends of inclined arms C C', as shown in Fig. 1. These arms are braced to the post A by a connecting bar, E, to make them firm and solid. In the lower ends of the post A and brace C is placed a screw-rod, $a$, which passes through the lower end of a post, D, forming the inner end post of the gate, the horizontal boards $D^1$ being let into the same, as well as into the short post $D^2$ at the outer end of the gate. The post D extends sufficiently far above the gate to balance the same when tilted. $d$ $d$ are braces placed on the screw-rod $a$ and fastened to the gate, one of said braces being attached to a horizontal tapering rail, $D^3$, attached to and forming part of the gate. The braces $d$ $d$, as well as the post D, are adjusted and held on the screw-rod $a$ by means of nuts $b$ $b$, as shown in Fig. 2. $D^4$ $D^4$ are inclined braces connecting the gate proper with the upright post D. The outer ends of the working levers are made heavier than the inner ends, so as to balance the gate and tip it more easily. The inner ends of the levers are, by rods $e$ $e$, connected with a bail, $f$, attached to the inclined braces $D^4$ where the same cross the upper one of the horizontal boards $D^1$ of the gate. The bail $f$ is, by a wire, $h$, connected to a spring-catch, $m$, which is fastened to the outer edge of the post $D^2$, and, when the gate is closed, catches in a depression in the side of the fence-post to hold the gate. From the outer end of each lever B depends a wire or cord, $i$, which, when pulled, causes the gate to turn on its pivot $a$ and fall over backward till the post D rests on the ground and the gate stands in a vertical position. The gate is returned to its original place in like manner by pulling on either of the cords or wires $i$.

Having thus fully described my invention, what I claim as new, and desire to secure by Letters Patent, is—

The gate pivoted on the screw-rod $a$, between the post and brace A C, in combination with the adjusting-nuts $b$ $b$ and braces $d$ $d$, all substantially as set forth.

In testimony that I claim the foregoing I have hereunto set my hand this 1st day of July, 1874.

STEPHEN S. DAVIS.

Witnesses:
F. W. HOWARD,
HENRY S. AUSTIN.